B. G. NELSON.
GRAIN SAVING DEVICE.
APPLICATION FILED APR. 17, 1912.
1,084,953.
Patented Jan. 20, 1914.
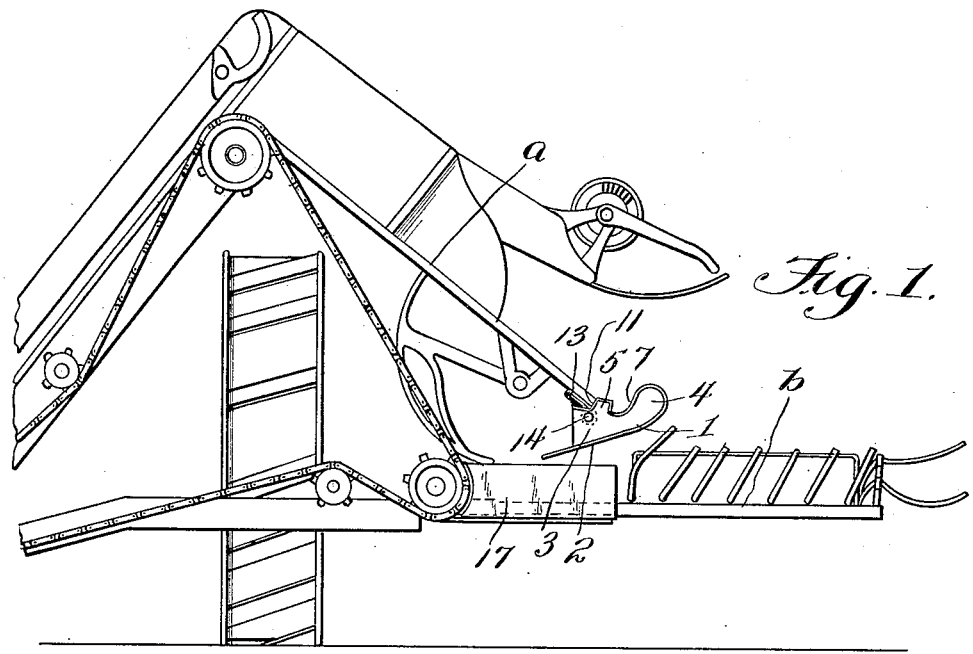
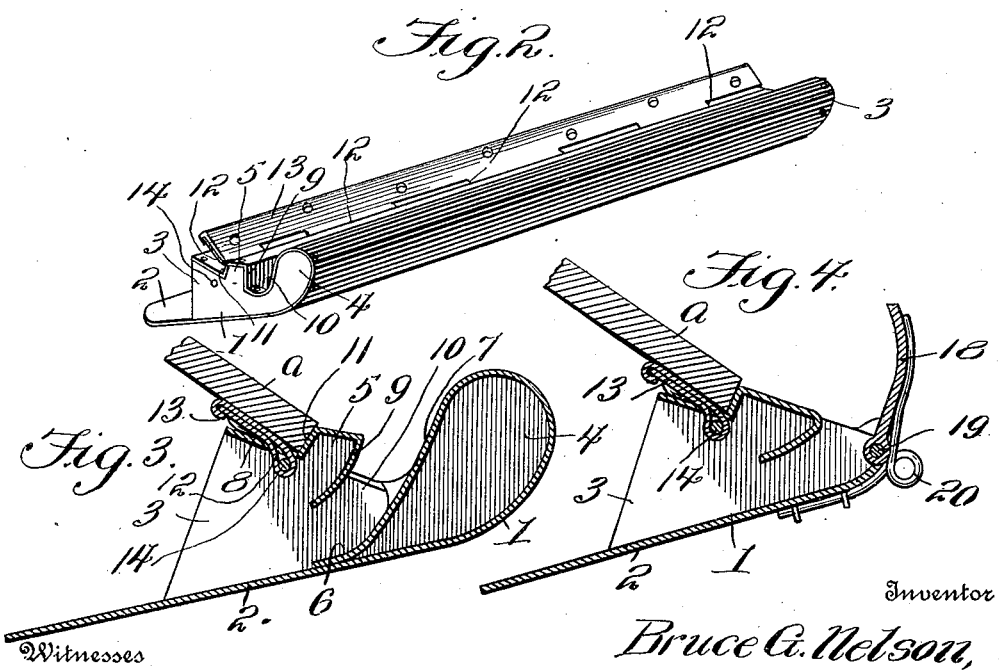
Witnesses
J. T. L. Wright
J. W. Garner
Inventor
Bruce G. Nelson,
By Victor J. Evans,
Attorney

UNITED STATES PATENT OFFICE.

BRUCE G. NELSON, OF LAKOTA, NORTH DAKOTA.

GRAIN-SAVING DEVICE.

1,084,953.

Specification of Letters Patent.   Patented Jan. 20, 1914.

Application filed April 17, 1912.   Serial No. 691,351.

*To all whom it may concern:*

Be it known that I, BRUCE G. NELSON, a citizen of the United States, residing at Lakota, in the county of Nelson and State of North Dakota, have invented new and useful Improvements in Grain-Saving Devices, of which the following is a specification.

This invention is a grain saving device for harvesters which is adapted to be readily attached to and used in connection with any ordinary grain binding or harvesting machine for the purpose of saving the shelled corn or grain that becomes detached from the heads due to the handling and operation of the machine and which shelled corn or grain would otherwise be lost.

The object of the invention is to simplify and improve the construction and operation of a device of this character.

This invention is specifically an improvement on the grain saving device for which Letters-Patent of the United States, No. 976,745 were granted to me November 22, 1910.

The invention consists in the construction, combination and arrangement of devices, hereinafter described and claimed.

In the accompanying drawing:—Figure 1 is a rear elevation of a grain saving device embodying my improvements, showing the same attached to and in connection with a grain binding machine, parts of the latter being omitted. Fig. 2 is a detail perspective view of my invention. Fig. 3 is a detail transverse vertical sectional view of the same, and also showing the lower portion of the grain deck to which the grain saving device is attached. Fig. 4 is a similar view, showing a modified form of my invention.

For the purposes of this specification, the grain deck of a binder is shown at *a* and the bundle carrier at *b*. In accordance with my invention, I provide a casing 1 which comprises an inclined bottom 2 which forms a chute and a pair of end walls 3 to the lower sides of which the inclined bottom is attached, the said end walls being substantially triangular in elevation and each of the end walls being formed at its outer end or side with an upwardly extending arm 4 the front, rear and upper edges of which are rounded so that the said arms are of substantially semi-circular form. Each end wall 3 is also provided at a point a suitable distance from the arm 4 with an upwardly extending projection 5. The upper portion of the inclined bottom plate 2 is extended and bent around and secured to the front, upper and rear edges of the arms 4 of the end walls 3 and also bears on the said bottom plate as at 6, so that in effect the extended and curved portion of the upper end of the bottom plate in connection with the arms 4 forms a deflecting wall 7 at the outer side of the casing and which rises from the upper end of the inclined bottom thereof. The top plate 8 of the casing is secured on the upper edges of the end walls 3 and is also bent around and secured to the upwardly projecting studs 5 so that the said top plate is formed with an outer shoulder 9 which is spaced from the rear side of the wall 7 so that an opening 10 is formed between them, and a rear shoulder 11 against which the lower end of the grain deck of the binding machine abuts. The said top plate is formed with openings 12 in line with each other and appropriately spaced from the rear shoulder 11 and a hinge plate 13, which is doubled, has its doubled portions extended through the said openings and pivotally mounted on a cross bar 14 which is secured to and connects the end walls 3. This hinge plate 13 is adapted to be attached to the rear side of the grain deck, at a point near the lower end thereof and serves to connect the grain saving device to the grain deck, as will be understood.

A suitable pan 17 or other receptacle is used in connection with my improved grain saving device and may be supported in a suitable receiving position upon the frame of the binder at a point below the lower end of the inclined bottom 2.

In the operation of my improved grain saving device, the sheaves as they pass from the grain deck to the bundle carrier strike the wall 7 which, being rounded, permits the bundles or sheaves to pass thereover and to drop upon the bundle carrier in the usual manner but the loose grain which drops from the sheaves and passes down on the grain deck drops through the space between the wall 7 and the top plate 8 and upon the inclined bottom 2 of the casing, the said inclined bottom acting to discharge the loose grain by gravity into the pan or other receptacle, as will be understood. Hence, the loose grain which has heretofore been lost is saved by my improved grain saving device and is of superior qualities as it is well-known that the largest grains, which ripen first, are more readily shelled and dropped from the sheaves than the smaller, comparatively inferior grain and, moreover, my improved grain saving device also catches the seeds which drop from weeds and noxious plants and prevents such seeds from falling from the grain deck back upon the soil.

In Fig. 4 of the drawing, I show a modified form of my invention, in which the deflecting wall is formed by a board 18 which is hinged or pivotally mounted as at 19 and is normally held in an inclined position by means of springs 20. This board catches the loose grain which drops from the sheaves or bundles and acts as a deflector to guide said loose grain to the inclined bottom of the casing through the space between the said deflecting wall or board and the top plate and owing to the fact that the said wall or board is hinged or pivoted, and is supported by the springs 20, said board or wall yields when the sheaves or bundles strike it as they pass down from the grain deck and enable the sheaves or bundles to readily pass thereover and fall into the bundle carrier, the board or wall springing back into normal position immediately after each sheaf or bundle passes it so that while affording a ready passage for the sheaves or bundles, the said yieldably supported wall serves efficiently to deflect or direct the loose grain from the grain deck onto the inclined bottom of the device.

While I have herein shown and described two forms of my invention, I would have it understood that other modifications may be made without departing from the spirit of my invention and within the scope of the appended claims.

I claim:—

1. The herein described grain saving device for attachment to the grain deck of a grain binder and comprising an inclined bottom, substantially triangular end walls rising from the bottom, a top plate inclined oppositely to the bottom and connecting the higher portions of the end walls, and a deflecting wall rising from the higher side of the inclined bottom, spaced from the lower side of the inclined top plate and extending upwardly to a point higher than any portion of the top plate.

2. The herein described grain saving device for attachment to the grain deck of a grain binder and comprising an inclined bottom, substantially triangular end walls rising from the bottom, a top plate inclined oppositely to the bottom and connecting the higher portions of the end walls, and a deflecting wall rising from the higher side of the inclined bottom, spaced from the lower side of the inclined top plate and extending upwardly to a point higher than any portion of the top plate, said top plate having a downwardly curved shoulder at its lower side, also spaced from the deflecting wall and inclining in the direction of the lower side of the inclined bottom.

3. A grain saving device for attachment to the grain deck of a grain binder and comprising a casing composed of a pair of end walls, a bottom inclined from its outer edge downwardly to its inner edge, a top plate on the upper portions of and connecting the said end walls, a deflecting wall spaced from the said top plate, arranged at the outer side of the casing and rising from the upper end of the inclined bottom, and an attaching plate pivotally connected to the said top plate.

4. A grain saving device for attachment to the grain deck of a grain binder and comprising a casing having a bottom inclined from its outer edge downwardly to its inner edge, and a pivotally mounted spring supported deflecting wall at the outer side of the casing and rising from the upper end of the inclined bottom, and means to attach said device to a binder.

In testimony whereof I affix my signature in presence of two witnesses.

BRUCE G. NELSON.

Witnesses:
  GEO. A. KELLOGG,
  CHARLOTTE G. RIEMER.

---

Copies of this patent may be obtained for five cents each, by addressing the "Commissioner of Patents, Washington, D. C."